US006576103B2

(12) United States Patent
Abramovich et al.

(10) Patent No.: US 6,576,103 B2
(45) Date of Patent: Jun. 10, 2003

(54) ELECTROCHEMICAL TRANSDUCER AND A METHOD FOR FABRICATING THE SAME

(75) Inventors: Igor A. Abramovich, Simsbury, CT (US); Alexei V. Kharlamov, Weatogue, CT (US)

(73) Assignee: PMD Scientific, Inc., Bloomfield, CT (US)

(*) Notice: Subject to any disclaimer, the term of this patent is extended or adjusted under 35 U.S.C. 154(b) by 43 days.

(21) Appl. No.: 09/927,679

(22) Filed: Aug. 10, 2001

(65) Prior Publication Data

US 2003/0029719 A1 Feb. 13, 2003

(51) Int. Cl.[7] .................................................. G01P 1/00
(52) U.S. Cl. ...................... 204/412; 204/252; 29/592.1
(58) Field of Search .......................... 204/228.3, 228.8, 204/242, 252, 253, 412; 29/592.1

(56) References Cited

U.S. PATENT DOCUMENTS

| 2,735,949 A | * | 2/1956 | Podolsky .................. 310/300 |
| 3,992,951 A | * | 11/1976 | Erspamer et al. ............. 73/497 |
| 4,167,818 A | * | 9/1979 | Cantarella et al. ........ 33/366.14 |
| 2001/0004049 A1 | * | 6/2001 | Ikeda et al. ................. 204/252 |

FOREIGN PATENT DOCUMENTS

| SU | 723458 A | * | 3/1980 | ........... G01P/15/08 |

* cited by examiner

Primary Examiner—Nam Nguyen
Assistant Examiner—Brian L Mutschler
(74) Attorney, Agent, or Firm—Cantor Colburn LLP

(57) ABSTRACT

A design and method for fabricating an electrochemical transducer including two housing plates, each of the housing plates being constructed of a polymer material and wherein each of the housing plates include an inner side, an outer side and a plurality of channels through the housing plates so as to communicate the inner side with the outer side, two anode electrodes, the anode electrodes disposed so as to be sandwiched between the housing plates, two cathode electrodes, the cathode electrodes disposed so as to be sandwiched between the anode electrodes and three porous insulating layers, the insulating layers being constructed of a polymer mesh and wherein each of the insulating layers is disposed so as to separate each of the anode electrodes from the cathode electrodes and each of the cathode electrodes from each other, while permitting the flow of an electrolyte between them.

21 Claims, 4 Drawing Sheets

ELECTROCHEMICAL TRANSDUCER AND A METHOD FOR FABRICATING THE SAME

STATEMENT REGARDING FEDERALLY SPONSORED RESEARCH OR DEVELOPMENT

The U.S. Government may have rights in this invention pursuant to SBIR award number 9901763 awarded by the National Science Foundation.

FIELD OF THE INVENTION

The present invention relates to a design for an electrochemical transducer for use in various sensors, such as seismometers and other motion detectors. In addition, the present invention is concerned with a method for fabricating such a device.

BACKGROUND OF THE INVENTION

Electrochemical transducer design is well known in the prior art and has been used primarily in seismometers, and other motion detectors. Typically, an electrochemical transducer operates by measuring the motion of an electrolytic fluid. To do this an electrochemical transducer is usually placed in a channel of a motion sensor filled with a specially prepared electrolytic solution, as shown in FIG. 1. A DC offset is then applied between the anodes causing an ionic flow, thus rapidly reducing the electric field within the bulk of the electrolytic fluid and resulting in a concentration gradient. When the motion detector experiences an acceleration, the electrolytic fluid experiences a motion relative to the channel which is communicated to the electrochemical transducer and which entrains ions and causes an additional charge transfer between the electrodes. This charge transfer is measured and interpreted as acceleration being detected.

As shown in FIG. 1, current electrochemical transducer 99 designs typically consist of four platinum electrodes (two anodes 100, two cathodes 102) separated by thin, microporous ceramic spacers 104, all of which are held together via a ceramic housing 106. The transducer is then embedded into a sensor housing which is then mounted into a motion detector 110, such as a seismometer, which includes a channel 112 filled with a specially prepared electrolytic solution 114. Two anode leads 116 and two cathode leads 118 are typically provided for communication with anodes 100 and cathodes 102, respectively. The transducer is typically placed within the channel 112 and hence is immersed within the electrolytic solution 114. In addition, the sensor housing is typically constructed out of a stable polymer (such as polysulfone) or a ceramic similar to that of the transducer. This existing design is capable of performing under relatively severe limitations placed on it by its operating environment. Among the limitations placed on this device is that all components of the device must be impervious to the aggressive chemical nature of the electrolytic solution.

In addition, because even the slightest movement of the electrodes under the influence of the electrolytic flow would cause a significant degradation of transducer performance, the transducer geometry must be extremely stable. This stability acts to minimize noise and distortion and works to ensure an accurate measurement.

To prevent cracks from forming in the ceramic components during the baking process, all ceramic parts must be prepared from the same original raw composition and very stringent preparation requirements must be imposed upon the temperature regime inside the furnace. All temperature gradients across the assembly must be reduced to near zero during the heating and the cooling process. This is time consuming and, even with the best precautions, the production yield is usually low, making mass production exceedingly expensive and impractical.

Lastly, because this geometric stability must remain over the operating temperature range and the life of the instrument, all of the components must be rigidly mounted and all components must have comparable temperature expansion coefficients.

However, this transducer has several major shortcomings related to its design and fabrication process. One such shortcoming is the preparation of the microscopically thin ceramic spacers. This preparation process is a labor-intensive and delicate process which has a very low yield.

Another problem associated with the baking process is that the ceramic shrinks during cooling which can result in warped electrode assemblies and non-uniform pore patterns. This leads to a micro-turbulent flow when the electrolyte moves through the transducer in response to ground motion and thus causes a non-linear transducer output which becomes more pronounced with increased electrode assembly size. In addition, this shrinking may cause the spacer thickness to be non-uniform, creating additional signal distortion.

These limitations place a practical limit on the size of the transducers to about six millimeters in diameter and because an electrochemical transducer's signal-to-noise ratio is proportional to the linear dimension of the transducer, it is desirable to have electrochemical transducers larger then current electrochemical transducer sizes. However, this is impractical because larger ceramic pieces are more susceptible to thermal gradients across their dimensions during the baking and cooling process, thus they are more susceptible to cracking. Because larger ceramic pieces tend to demonstrate more pronounced dimensional irregularities than do smaller ceramic pieces, larger electrochemical transducers are difficult and more costly to produce than smaller electrochemical transducers.

Unfortunately, because the majority of these problems are created during the baking process, these problems only become apparent after the completion of the heating and cooling cycle, making mass commercial production costly and yield predictability highly unreliable.

The need remains for an electrochemical transducer design which incorporates or exceeds performance characteristics of current electrochemical transducer designs, yet is relatively simple and inexpensive to produce. In addition, the need remains for an electrochemical transducer design and fabrication method that allows larger electrochemical transducers to be produced with a much more predictable yield.

SUMMARY OF THE INVENTION

An embodiment of the invention is an electrochemical transducer which comprises: two housing plates, each of the housing plates being constructed of a polymer material and wherein each of the housing plates include an inner side, an outer side and a plurality of channels through the housing plates so as to communicate the inner side with the outer side; two anode electrodes, the anode electrodes disposed so as to be sandwiched between the housing plates; two cathode electrodes, the cathode electrodes disposed so as to be sandwiched between the anode electrodes; and three porous insulating layers, the insulating layers being constructed of a polymer mesh and wherein each of the insulating layers is disposed so as to separate each of the anode electrodes from the cathode electrodes and each of the cathode electrodes from each other, while permitting the flow of an electrolyte between them.

Another embodiment of the invention is a method for fabricating an electrochemical transducer comprising: obtaining two anode electrodes, wherein each of the anode electrodes has an anode lead; obtaining two cathode electrodes, wherein each of the cathode electrodes has a cathode lead; obtaining three insulating layers, wherein each of the insulating layers are constructed out of a polymer mesh having insulating and porous properties; obtaining two housing plates, the housing plates being constructed of a polymer material and having an outer edge and a plurality of channels so as to allow communication through the housing plates; arranging the anode electrodes, the cathode electrodes and the insulating layers so as to be parallel with each other, wherein the cathode electrodes are disposed between the anode electrodes and wherein one of the insulating layers is disposed between the cathode electrodes and between each of the anode electrodes and the cathode electrodes so as to form a core subassembly; arranging the housing plates so as to be parallel with each other; positioning the core subassembly between the housing plates such that the core subassembly is communicated with the plurality of channels; compressing the housing plates together so as to supportingly and non-movably hold the core subassembly between the housing plates; and securing the housing plates together using a plate securing means so as to create a transducer.

DETAILED DESCRIPTION OF THE INVENTION

Figure 1:
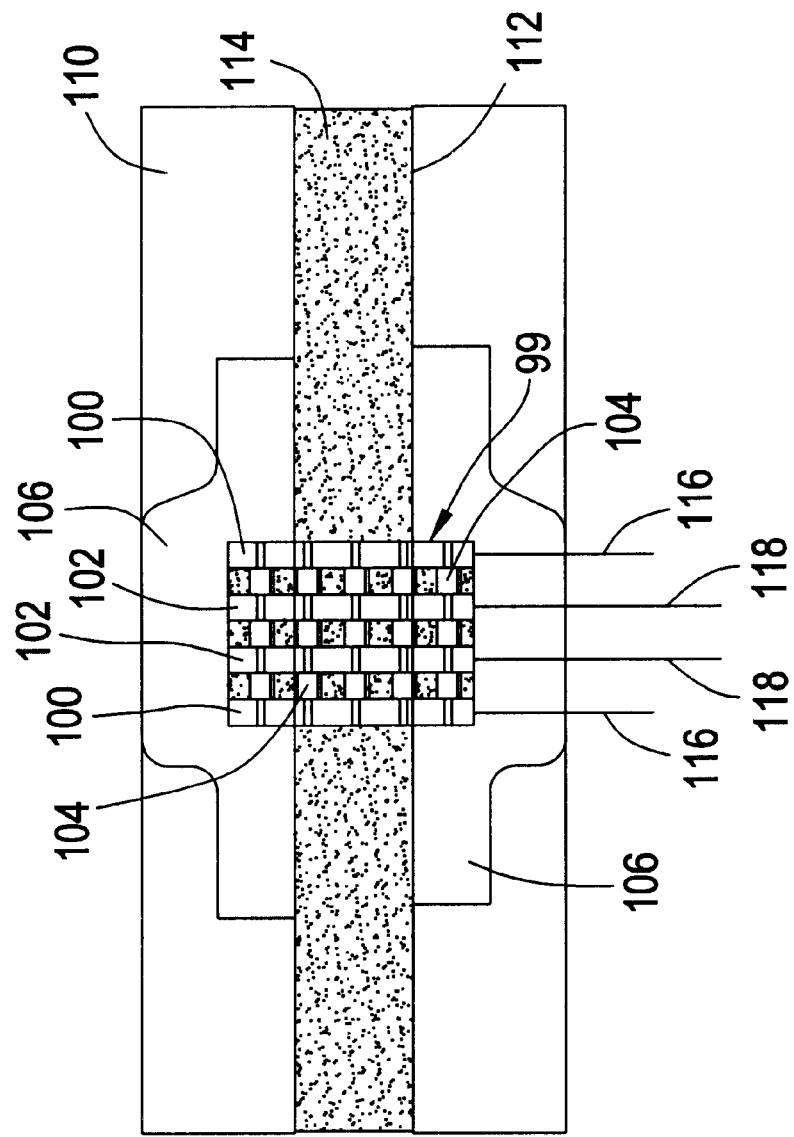
FIG. 1 illustrates a side view of an existing electrochemical transducer disposed within a channel containing an electrolytic fluid.
Figure 2:
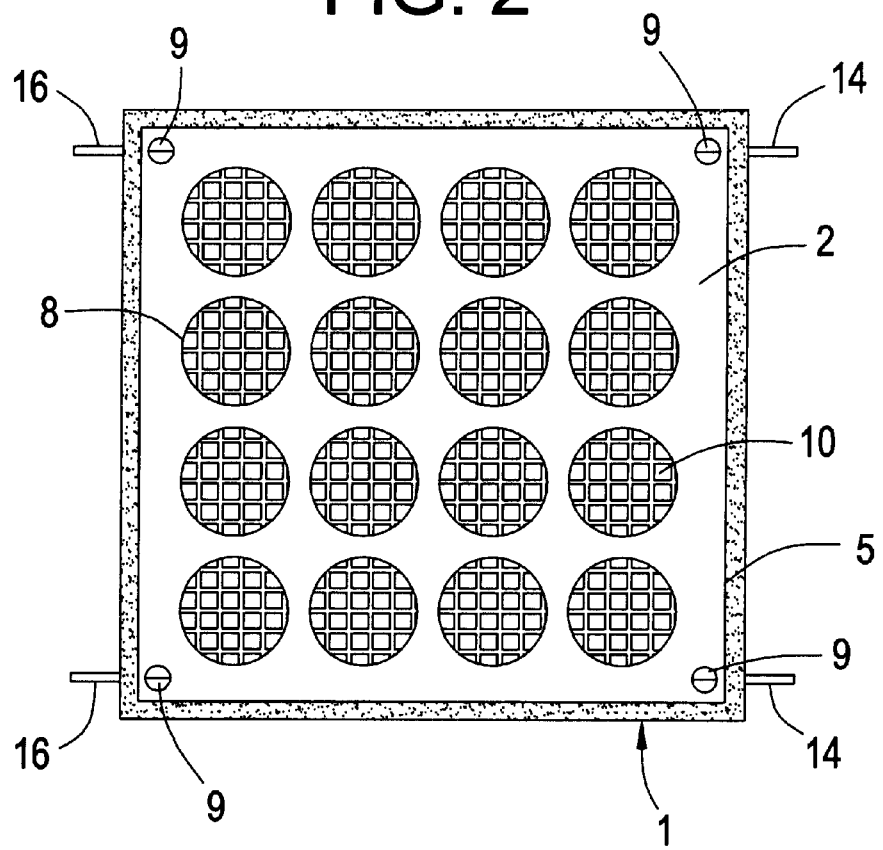
FIG. 2 illustrates a top view of an electrochemical transducer in accordance with an embodiment of the present invention.
Figure 3:
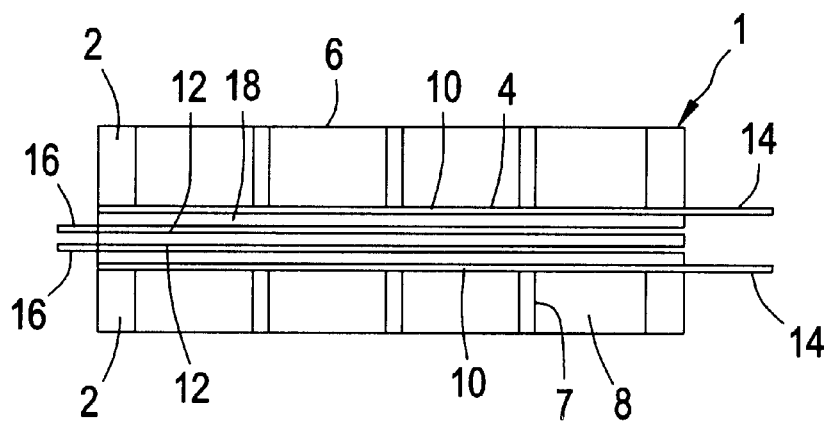
FIG. 3 illustrates a side view of an electrochemical transducer in accordance with an embodiment of the present invention.
Figure 4:
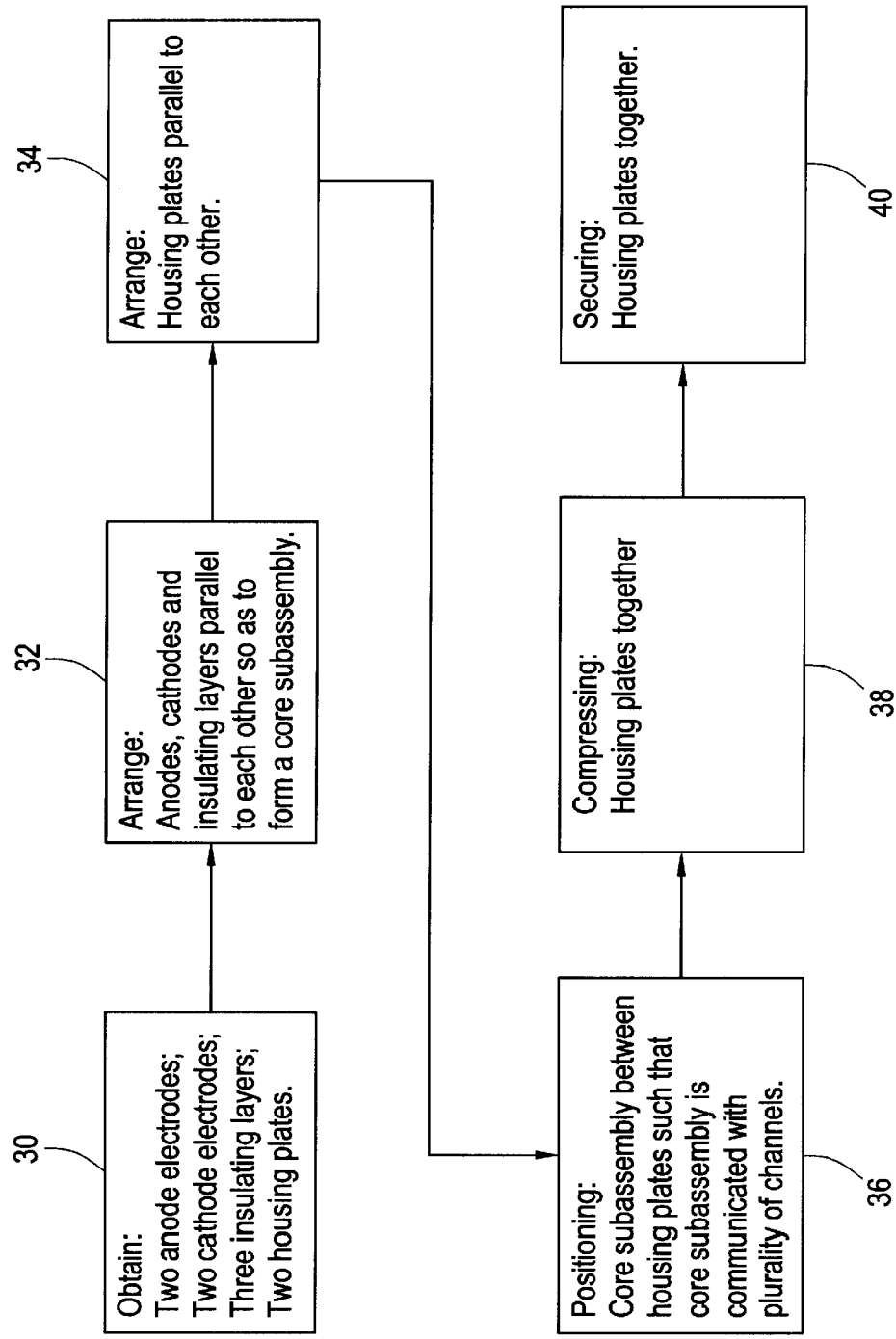
FIG. 4 illustrates a flow diagram describing the Fabrication Method of an electrochemical transducer in an embodiment of the present invention.

Referring to the drawings, FIG. 2 and FIG. 3 illustrates an electrochemical transducer 1 in accordance with an embodiment of the present invention. Electrochemical transducer 1 preferably includes two housing plates 2, each similar in size and shape to the other and each having an inner side 4, an outer side 6, an outer edge 5, and a plurality of channels 8 through housing plates 2 so as to communicate outer side 6 with inner side 4. Two anode electrodes 10 and two cathode electrodes 12, each of which are similar in size and shape to housing plates 2, are positioned between housing plates 2. Anode electrodes 10 and cathode electrodes 12 are preferably constructed from platinum mesh.

Each anode electrode 10 preferably has an anode lead 14 extending away from the anode electrode 10 so as to extend out from electrochemical transducer 1 and each cathode electrode 12 preferably has a cathode lead 16 extending away the cathode electrode 12 so as to extend out from electrochemical transducer 1. Electrochemical transducer 1 also includes three insulating layers 18, which are similar in size and shape to anode electrode 10 and cathode electrode 12.

Referring to FIG. 3, housing plates 2 are disposed such that inner side 4 of each housing plate 2 are parallel and adjacent to the other, thus allowing plurality of channels 8 from each housing plate 2 to be aligned with each other. Channel walls 7 separate the channels 8 and provide a surface for holding the anode electrodes 10, cathode electrodes 12 and insulating layers 18 together, such that they are rigidly held parallel to each other. Anode electrodes 10 are disposed between housing plates 2 such that they are parallel to each other, parallel to the inner side 4 of housing plates 2 and such that they are communicated with said plurality of channels 8 in a sandwich fashion. Cathode electrodes 12 are also disposed in a sandwich fashion between anode electrodes 10 such that they are parallel to each other and parallel to anode electrodes 10. In addition, each anode electrode 10 and each cathode electrode 12 is disposed such that each anode lead 14 and each cathode lead 16, respectively, is protruding from the electrochemical transducer 1. Insulating layer 18 is preferably disposed between each anode electrode 10 and cathode electrode 12 so as to separate the anode electrodes 10 from the cathode electrodes 12. An insulating layer 18 is also disposed between cathode electrodes 12 so as to separate the cathode electrodes 12 from each other. In accordance with an embodiment of the invention, insulating layers 18 are preferably porous, so as to allow the flow of an electrolyte across the transducer.

Housing plates 2 are then compressed together so as to non-movably contain anode electrodes 10, cathode electrodes 12 and insulating layers 18 in a sandwich fashion. This acts to prevent anode electrodes 10, cathode electrodes 12 and insulating layers 18 from moving relative to housing plates 2. Housing plates 2 are then nonmovably secured together using a plate securing device 9 so as to nonmovably contain anode electrodes 10, cathode electrodes 12 and insulating layers 18. In accordance with an embodiment of the invention, plate securing device 9 may be an adhesive material (e.g. epoxy) or a gasket constructed of a gasket material impervious to an electrolytic fluid applied to outer edges 5, at least one screw or at least one stud. Also, housing plates 2 are disposed relative to each other so as to cause plurality of channels 8 of each housing plate 2 to be aligned with each other. This arrangement advantageously allows the housing plates 2 to nonmovably contain and rigidly support anode electrodes 10, cathode electrodes 12 and insulating layers 18 so as to prevent any movement or flexing of anode electrodes 10, cathode electrodes 12 and insulating layers 18. Further, in accordance with an embodiment of the present invention, anode electrodes 10, cathode electrodes 12, insulating layers 18 and housing plates 2 are non-movably disposed relative to each other so as to allow plurality of channels 8 to be communicated with anode electrodes 10, cathode electrodes 12 and insulating layers 18 through each of housing plates 2.

Referring to FIG. 2, FIG. 3, FIG. 4, FIG. 5a and FIG. 5b, a method for fabricating an electrochemical transducer I of the present invention is illustrated. Two anode electrodes 10 each having an anode lead 14, two cathode electrodes 12 each having a cathode lead 16, three insulating layers 18, two housing plates 2, having a plurality of channels 8, and a sensor body 60 having at least one body opening 62 are obtained as in step 30. In accordance with an embodiment of the invention, body opening 62 is disposed so as to be communicated with the plurality of channels 8.

Anode electrodes 10, cathode electrodes 12 and the three insulating layers 18 are positioned parallel to each other as shown in FIG. 3 in step 32 so as to form a core subassembly 64. The housing plates 2 are then arranged at step 34 so as to be parallel with each other with the core subassembly 64 positioned between housing plates 2, as in step 36, so as to be parallel to and adjacent with inner side 4 such that anode electrode 10 is communicated with and positioned over the plurality of channels 8. The housing plates 2, anode electrodes 10, cathode electrodes 12 and insulating layers 18 are positioned and disposed so as to be parallel to each other. In addition, the anode electrodes 10 and the cathode electrodes 12 are disposed so that each of the anode leads 14 and each of the cathode leads 16 are protruding beyond and extending away from the housing plates 2.

The housing plates 2 are then compressed together as in step 38 so as to supportingly and nonmovably hold the core subassembly 64 together between housing plates 2 in a sandwich fashion. Housing plates 2 are then secured together as in step 40 so as to create an electrochemical transducer 1. Housing plates 2 are preferably compressed and secured together using a plate securing device 9 so as to nonmovably contain core subassembly 64. In accordance with an embodiment of the invention, plate securing device 9 may be any suitable fastener. A gasket may be interposed between the housing plates 2. Alternatively, the housing plates may be secured together using an adhesive such as epoxy. The channel walls 7 apply pressure over the surface of the anode electrodes 10, cathode electrodes 12 and insulating layers 18 to prevent movement of these elements.

Once the housing plates 2 have been compressed together, the electrochemical transducer 1 is installed as in step 40 into sensor body 60 such that the plurality of channels 8 are positioned over and communicated with body opening 62. In accordance with an embodiment of the invention, sensor body 60 is preferably a multi-piece sensor body 60 assembly having a plurality of sensor body pieces secured together via a body securing device, such as screws, studs or epoxy. However, it is considered within the scope of the invention that sensor body 60 may be constructed of any sensor body construction suitable to the desired end purpose, such as a single piece construction. Also, sensor body 60 preferably includes a diaphragm 66 disposed relative to said sensor body 60 so as to contain electrolytic fluid 50 within fluid channel 48.

Figure 5A:
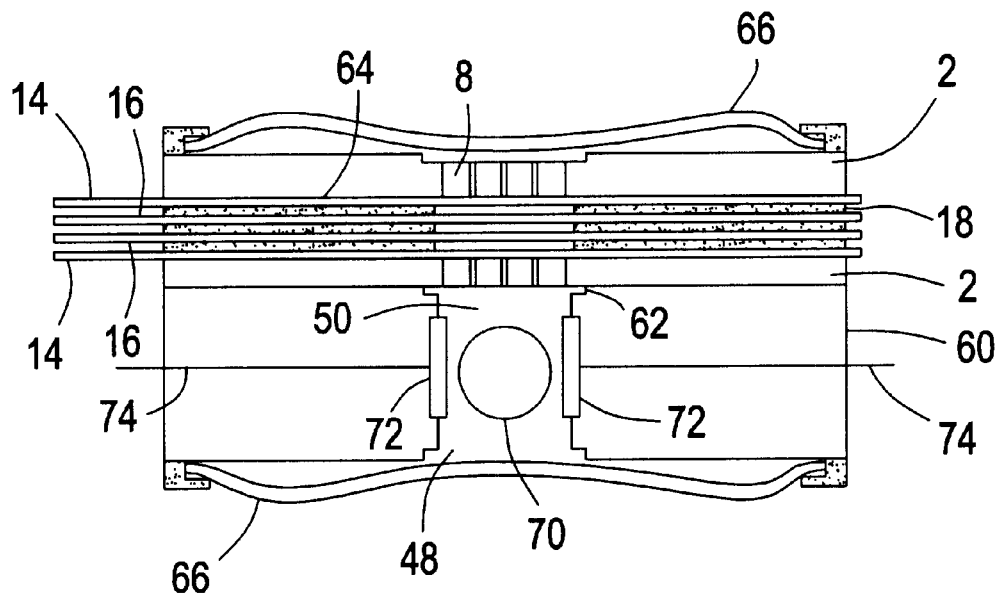
FIG. 5a illustrates a side view of an electrochemical transducer in an embodiment of the present invention, disposed within a motion sensor channel containing an electrolytic fluid.
Figure 5B:
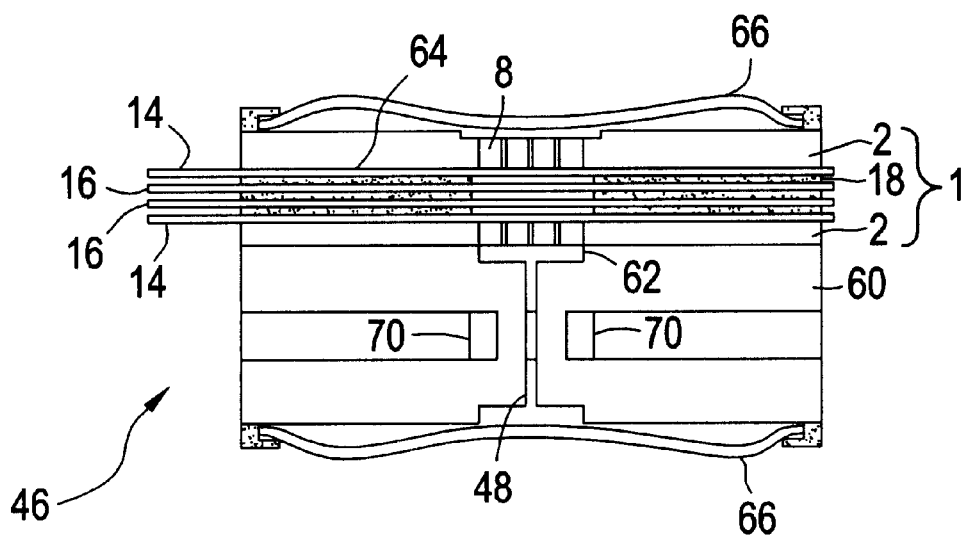
FIG. 5b illustrates an opposing side view of an electrochemical transducer in an embodiment of the present invention, disposed within a motion sensor channel containing an electrolytic fluid.

Referring to FIG. 5a and FIG. 5b, an electrochemical transducer 1 is illustrated in a typical operation. As shown, the electrochemical transducer 1 is disposed within a sensor body 60 having a fluid channel 48 filled with a specially prepared electrolytic fluid 50. In addition, a diaphragm 66 is provided and is disposed relative to sensor body 60 so as to contain electrolytic fluid 50 within fluid channel 48. The electrochemical transducer 1 is disposed within the sensor body 60 so as to allow the electrolytic fluid 50 to communicate with the plurality of channels 8. A DC offset voltage potential is applied across the anode leads 14 causing an ionic flow within electrolytic fluid 50 resulting in a rapid reduction of the electric field within the bulk of the electrolytic fluid 50, thus creating a concentration gradient. When the motion sensor 46 experiences an acceleration, the electrolytic fluid 50 experiences a flow relative to the fluid channel 48 which is communicated to the electrochemical transducer 1 and which entrains ions and causes an additional charge transfer between the cathode electrodes 12. This additional charge transfer is measured by using any suitable measuring device and interpreted as an acceleration being detected.

In accordance with an embodiment of the invention and as shown in FIG. 5a and FIG. 5b, permanent magnets 70 and magnet electrodes 72 may be disposed across the fluid channel 48 such that the magnetic and electrical fields are directed along mutually orthogonal axes. The magnet electrodes 72 may be energized via power leads 74 in response to the signal output of the transducer 1, thereby providing a force-balancing feedback via the magnetohydrodynamic (MHD) effect which is known to those skilled in the art.

Platinum anode electrodes 10 and platinum cathode electrodes 12 are preferably constructed out of a material having a mesh grid. In accordance with the present invention, the mesh grid may be uniform or non-uniform and may have different thicknesses. It is also considered within the scope of the present invention that any anode electrodes 10 and cathode electrodes 12 suitable to the desired end purpose may be used.

Housing plates 2 are preferably constructed from any suitable polymer material known in the art, such as polysulfone and may be secured together using any plate securing device known in the art and suitable to the desired end purpose, such as a screw, a stud or a gasket made out of a material impervious to the electrolytic fluid, such as butyl rubber or Teflon.

Insulating layers 18 are preferably constructed from a precision polymer mesh having insulating and uniform porous properties and a well defined and uniform mesh thickness, such as fluorocarbon. However, it is considered within the scope of the invention that insulating layers 18 may be constructed from any porous insulating material known in the art and suitable to the desired end purpose.

In accordance with an embodiment of the invention, sensor body 60 may be a single piece or a multi-piece assembly and may be secured together using any body securing device known in the art and suitable to the desired end purpose.

It is to be understood that the invention is not limited to the illustrations described and shown herein, which are deemed to be merely illustrative of the best modes of carrying out the invention, and which are susceptible to modification of form, size, arrangement of parts and details of operation. The invention rather is intended to encompass all such modifications which are within its spirit and scope as defined by the claims.

What is claimed is:

1. An electrochemical transducer comprising:
   two housing plates, each of said housing plates being constructed of a polymer material and wherein each of said housing plates include an inner side, an outer side and a plurality of channels through said housing plates so as to communicate said inner side with said outer side;
   two anode electrodes, said anode electrodes disposed so as to be sandwiched between said housing plates;
   two cathode electrodes, said cathode electrodes disposed so as to be sandwiched between said anode electrodes; and
   three porous insulating layers, said insulating layers being constructed of a polymer mesh and wherein each of said insulating layers is disposed so as to separate each of said anode electrodes from said cathode electrodes and each of said cathode electrodes from each other, while permitting the flow of an electrolyte between them.

2. A transducer according to claim 1, further comprising a plate securing means for securing said housing plates to each other so as to prevent said anode electrodes, said cathode electrodes and said insulating layers from moving relative to said housing plates.

3. A transducer according to claim 2, wherein said plate securing means includes at least one screw.

4. A transducer according to claim 2, wherein said plate securing means includes at least one stud.

5. A transducer according to claim 2, wherein said plate securing means includes a gasket, wherein said gasket is made out of a material impervious to an electrolytic fluid.

6. A transducer according to claim 1, wherein said housing plates are constructed so as to rigidly and nonmovably support said anode electrodes, said cathode electrodes and said insulating layers.

7. A transducer according to claim 1, wherein said housing plates are constructed and disposed relative to said anode electrodes and said cathode electrodes so as to cause said anode electrodes and said cathode electrodes to remain rigid and inflexible.

8. A transducer according to claim 1, wherein said anode electrodes and said cathode electrodes are constructed of a platinum mesh.

9. A transducer according to claim 1, wherein said cathode electrodes are constructed of a platinum mesh and wherein said cathode electrodes each comprises a cathode lead for communicating with said cathode electrode.

10. A transducer according to claim 1, further comprising a polymer sensor body, wherein said housing plates, said anode electrodes, said cathode electrodes and said insulating layers are non-movably associated with said sensor body and wherein said sensor body includes at least one body opening so as to allow communication with said plurality of channels.

11. A transducer according to claim 10, wherein said sensor body is constructed of a plurality of sensor body pieces so as to form a sensor body assembly.

12. A transducer according to claim 11, further comprising a body securing means for securing said plurality of sensor body pieces together.

13. A transducer according to claim 1, wherein said insulating layers are constructed of a polymer mesh having a uniform mesh thickness.

14. A transducer according to claim 1, further comprising a diaphragm, said diaphragm being disposed so as to contain an electrolytic fluid within said plurality of channels.

15. A method for fabricating an electrochemical transducer comprising:

obtaining two anode electrodes, wherein each of said anode electrodes has an anode lead;

obtaining two cathode electrodes, wherein each of said cathode electrodes has a cathode lead;

obtaining three insulating layers, wherein each of said insulating layers are constructed out of a polymer mesh having insulating and porous properties;

obtaining two housing plates, said housing plates being constructed of a polymer material and having an outer edge and a plurality of channels so as to allow communication through said housing plates;

arranging said anode electrodes, said cathode electrodes and said insulating layers so as to be parallel with each other, wherein said cathode electrodes are disposed between said anode electrodes and wherein one of said insulating layers is disposed between said cathode electrodes and between each of said anode electrodes and said cathode electrodes so as to form a core subassembly;

arranging said housing plates and said core subassembly such that said core subassembly is communicated with said plurality of channels;

compressing said housing plates together so as to supportingly and non-movably hold said core subassembly between said housing plates; and securing said housing plates together using a plate securing means.

16. The method of claim 15, wherein said arranging said core subassembly includes positioning said core subassembly so as to be parallel with said housing plates and so as to allow said anode leads and said cathode leads to protrude beyond said housing plates.

17. The method of claim 15, wherein said securing said housing plates includes disposing said transducer within a sensor body, wherein said sensor body includes at least one body opening.

18. The method of claim 17, wherein said sensor body includes a diaphragm disposed so as to contain an electrolytic fluid within said plurality of channels.

19. The method of claim 15, wherein said plate securing means includes a gasket, wherein said gasket is made out of a material impervious to an electrolytic fluid.

20. The method of claim 15, wherein said plate securing means includes at least one stud.

21. The method of claim 15, wherein said plate securing means includes at least one screw.

* * * * *